3,451,810
METHOD OF MANUFACTURING OXYGEN ELECTRODES BY SINTERING Ag AND AN Ag-Cd ALLOY
Dexter William Smith, Shirley, Solihull, England, assignor to Joseph Lucas (Industries) Limited, Birmingham, England
No Drawing. Filed Aug. 1, 1967, Ser. No. 657,535
Int. Cl. B22f 3/12; H01m 13/06
U.S. Cl. 75—214         8 Claims

ABSTRACT OF THE DISCLOSURE

An oxygen electrode is manufactured by mixing silver in particle form with particles of an alloy of silver and cadmium the alloy having a gamma-brass structure and being present in proportions up to 7.5%, and the electrode being manufactured from the mixture by pressing and sintering.

---

This invention is a continuation-in-part of my application No. 508,592 filed Nov. 18, 1965 and now abandoned. The invention relates to a method of manufacturing an oxygen electrode which can be used in an alkaline fuel cell, but can also be used in a hybrid fuel cell. The hybrid fuel cell, of which the zinc-air battery is the best known example, can be considered as a fuel cell in which the fuel electrode is replaced by a battery plate, or as an alkaline battery in which one of the battery plates is replaced by an oxygen electrode.

The invention resides in a method of manufacturing a porous plate in which silver in particle form is mixed with an alloy of cadmium and silver, this alloy having a catalytic effect which increases the number of free electrons available and so increases the efficiency of the electrode. The alloy must have a gamma-brass structure, because although there are several alloys which can be added to silver to produce the required catalytic effect, none of these alloys with the exception of the silver-cadmium alloy in the gamma-brass configuration can be ground to powder form and then mixed with silver and worked to form a plate.

In one particular example of the invention, 40% by weight of silver is alloyed with 60% by weight of cadmium to produce a silver-cadmium alloy with a gamma-brass structure. The alloy is ground in a non-oxidising medium, preferably a gaseous medium, until it has a particle size of less than 45 microns.

The next step is to mix the alloy with silver in particle form. The particle size of the silver depends on the product to be manufactured, but is preferably less than 45 microns, and ideally less than 10 microns. Silver in particle form is commonly sold in a dispersion, and the silver is extracted from the dispersion when required using an organic solvent. This method of actually producing the silver in particle form is well known, and not therefore described in great detail.

The silver is mixed with the silver-cadmium alloy, the proportion of alloy added being of some importance. If experiments are conducted by taking silver in particle form and adding to its the predetermined proportions by weight of the silver-cadmium alloy, it is found that even with a very small amount of silver-cadmium alloy present, the catalytic effect is marked, so that an improved electrode is produced. As the proportion of the silver-cadmium alloy is increased, the efficiency of the electrode is also increased, and so a maximum value of efficiency is reached when the proportion of the silver-cadmium alloy is 5% by weight. Further increase in the proportion of silver-cadmium alloy results in a decrease in the efficiency of the electrode, until when 7.5% by weight of the silver-cadmium is added, the efficiency is the same as when no silver-cadmium alloy is added. From this it will be seen that an advantageous effect can be achieved by adding silver-cadmium alloy in proportions up to 7.5% by weight, but that the preferred amount is 5% by weight.

The powder consisting of the silver and the silver-cadmium alloy is thoroughly mixed, and is then pressed to produce a plate, which is sintered in a non-oxidising atmosphere. The value of pressure required is not dependent on the proportions of silver and alloy, and in fact is not critical at all. The purpose of applying pressure is to maintain the compacted mass in the required shape of a plate, and obviously an expert would not apply a pressure which was so great that the required shape would not be produced and the required porosity impaired. As a guide, it can be indicated that pressures of up to 2000 p.s.i. would be suitable, a preferred pressure being of the order of 500 p.s.i. The sintering temperature is also independent of the proportions of silver and silver-cadmium alloy. The upper limit of temperature is 600° C., because above this figure the cadmium volatalises, so that the powder is no longer useful. The lower limit is not critical, but it must be borne in mind that the time taken for the sintering step increases with decrease in temperature. For this reason, the temperature is kept relatively near to 600° C., and the preferred range is between 500° C. and 600° C. It is found essential to sinter the plate in a non-oxidising medium, which could be a liquid medium, although it will be apparent that it is more convenient to have a gaseous medium during this step.

In order to ensure that the particles of silver and silver-cadmium alloy used are the required size, an air sieve is preferably employed. This sieve uses a stream of air to deviate particles by an amount dependent on their weight, so that it is possible to extract from the air stream particles lying between two given weights, and excludes all other particles. The silver is first placed in a sieve and particles of the required weight are extracted. The same procedure is used for the silver-cadmium alloy, and mixing is then carried out as described above.

The electrode can be used in conjunction with a hydrogen electrode in an alkaline fuel cell, or in conjunction with a battery plate in a primary hybrid fuel cell, of which the best known example is the zinc-air battery which utilises a zinc battery, plate and an oxygen electrode.

Having thus described my invention what I claim as new and desire to secure by Letters Patent is:

1. A method of manufacturing an oxygen electrode comprising the steps of mixing particles of silver with particles of an alloy of silver and cadmium, said alloy having a gamma-brass structure and being present in proportions up to 7.5% by weight, pressing the mixture to produce a plate, and sintering the plate in a non-oxidising medium to form the electrode.

2. A method as claimed in claim 1 in which said alloy is present in a proportion of 5% by weight.

3. A method as claimed in claim 1 in which the particle size of said silver is less than 45 microns.

4. A method as claimed in claim 1 in which the particle size of said silver is less than 10 microns.

5. A method as claimed in claim 1 in which sintering is effected at a temperature below 600° C.

6. A method as claimed in claim 4 in which the temperature is between 500° C. and 600° C.

7. A method as claimed in claim 1 in which, prior to mixing with said silver, said alloy is ground in a non-oxidising medium to a particle size of less than 45 microns.

8. A method of manufacturing an oxygen electrode, comprising alloying silver and cadmium to produce an alloy having a gamma-brass structure, grinding the alloy in a non-oxidising medium to a particle size of less than 45 microns, mixing the alloy with silver of particle size less than 10 microns in proportions of 95% silver to 5% alloy, pressing the mixture to produce a plate, and sintering the plate in a non-oxidising medium at a temperature less than 600° C. to produce the electrode.

References Cited

UNITED STATES PATENTS

| | | | |
|---|---|---|---|
| 3,050,386 | 8/1962 | Von Dohran | 75—222 X |
| 3,104,990 | 5/1960 | Solomon | 136—120 |
| 3,287,112 | 11/1966 | Cheltenham | 75—222 |
| 3,340,098 | 9/1967 | Smith | 75—173 X |
| 3,359,099 | 12/1967 | Lindstrom | 75—224 X |
| 3,359,623 | 12/1967 | Gwyn | 75—208 X |
| 3,367,801 | 2/1968 | Kreiselmaier | 29—182 X |

OTHER REFERENCES

"Silver: A Survey of Its Production, Properties, and Engineering Uses." L. B. Hunt, Metal Industry, Feb. 6, 1948, pp. 103–105.

Hansen: "Constitution of Binary Alloys," 2nd ed. N.Y. McGraw Hill, 1958, pp. 13–15.

BENJAMIN R. PADGETT, *Primary Examiner.*

ARTHUR J. STEINER, *Assistant Examiner.*

U.S. Cl. X.R.

75—200, 222; 136—120